US009542059B2

(12) United States Patent
Han et al.

(10) Patent No.: US 9,542,059 B2
(45) Date of Patent: Jan. 10, 2017

(54) GRAPHICAL SYMBOL ANIMATION WITH EVALUATIONS FOR BUILDING AUTOMATION GRAPHICS

(75) Inventors: James K. Han, Long Grove, IL (US); Patrick Stirnemann, Besenbüren (CH); Andreas Hersche, Island Lake, IL (US); Ganesh Ramanathan, Unteraegeri (CH)

(73) Assignee: Siemens Schweiz AG, Zurich (CH)

( * ) Notice: Subject to any disclaimer, the term of this patent is extended or adjusted under 35 U.S.C. 154(b) by 373 days.

(21) Appl. No.: 13/537,975

(22) Filed: Jun. 29, 2012

(65) Prior Publication Data

US 2013/0083035 A1    Apr. 4, 2013

Related U.S. Application Data

(63) Continuation-in-part of application No. PCT/US2011/054141, filed on Sep. 30, 2011.

(60) Provisional application No. 61/541,925, filed on Sep. 30, 2011.

(51) Int. Cl.
G09G 5/00 (2006.01)
G06F 3/048 (2013.01)
G05B 15/02 (2006.01)
G05B 23/02 (2006.01)
G06T 11/20 (2006.01)

(52) U.S. Cl.
CPC ............ *G06F 3/048* (2013.01); *G05B 15/02* (2013.01); *G05B 23/027* (2013.01); *G05B 23/0216* (2013.01); *G05B 23/0272* (2013.01); *G06T 11/206* (2013.01); *G05B 2219/2642* (2013.01)

(58) Field of Classification Search
CPC ............ G05B 23/0272; G05B 23/027; G05B 23/0216; G05B 15/02; G05B 2219/2642; G06F 3/048; G06T 11/206; G06T 13/00
See application file for complete search history.

(56) References Cited

U.S. PATENT DOCUMENTS

2007/0135137 A1    6/2007 Olson
2008/0126172 A1*   5/2008 Melamed et al. ............... 705/9
2010/0245083 A1*   9/2010 Lewis ........................ 340/540
(Continued)

FOREIGN PATENT DOCUMENTS

WO    2009/046095 A1    4/2009
WO    2011/041848 A1    4/2011

OTHER PUBLICATIONS

PCT Search Report dated Jul. 31, 2014, for Application No. PCT/US2012/057043. (8 pages).

Primary Examiner — James A Thompson
Assistant Examiner — Xilin Guo

(57) ABSTRACT

Automation systems, methods, and mediums. A method includes identifying a value for a data point associated with a device in a building. The value is received from a management system operably connected to the device. The method includes mapping the value for the data point to a graphical representation of the value for the data point. The method includes generating a display comprising a graphic for the building and a symbol representing the device. The method includes displaying the graphical representation of the value for the data point in association with the symbol representing the device. Additionally, the method includes modifying the graphical representation of the value based on a change in the value in response to identifying the change in the value from the management system.

20 Claims, 10 Drawing Sheets

(56) References Cited

U.S. PATENT DOCUMENTS

2011/0175701 A1* 7/2011 Kobayashi .................... 340/3.7
2011/0285749 A1* 11/2011 Nielsen et al. ............... 345/629
2011/0288895 A1* 11/2011 Perez et al. .................. 705/7.12
2012/0246170 A1* 9/2012 Iantorno ....................... 707/748

* cited by examiner

GRAPHICAL SYMBOL ANIMATION WITH EVALUATIONS FOR BUILDING AUTOMATION GRAPHICS

CROSS-REFERENCE TO OTHER APPLICATIONS

This application claims priority to PCT Application Serial No. PCT/US2011/054141, filed Sep. 30, 2011, entitled "Management System with Versatile Display" and to U.S. Provisional Patent Application Ser. No. 61/541,925, filed Sep. 30, 2011, entitled "Management System Using Function Abstraction for Output Generation", both of which are hereby incorporated by reference. This application also shares some subject matter in common with, but is otherwise unrelated to, the following patent applications, filed concurrently herewith, all of which are incorporated by reference:

- U.S. patent application Ser. No. 13/538,275, filed Jun. 29, 2012, for "Navigation and Filtering with Layers and Depths for Building Automation Graphics," now U.S. Pat. No. 8,933,930;
- U.S. patent application Ser. No. 13/538,073, filed Jun. 29, 2012, for "Unified Display of Alarm Configurations Based On Event Enrollment Objects," now U.S. Pat. No. 8,854,202;
- U.S. patent application Ser. No. 13/537,911, filed Jun. 29, 2012, for "Automated Discovery and Generation of Hierarchies for Building Automation and Control Network Objects," published as U.S. Patent Publication US 2013-0086066 A1;
- U.S. patent application Ser. No. 13/538,182, filed Jun. 29, 2012, for "Management System User Interface in a Building Automation System," now U.S. Pat. No. 9,170,702; and
- U.S. patent application Ser. No. 13/538,242, filed Jun. 29, 2012, for "Management System User Interface for Comparative Trend View," published as U.S. Patent Publication US 2013-0086521 A1.

TECHNICAL FIELD

The present disclosure is directed, in general, to management systems and, more particularly, to graphical symbol animations with evaluations for building automation graphics.

BACKGROUND OF THE DISCLOSURE

Building automation systems encompass a wide variety of systems that aid in the monitoring and control of various aspects of building operation. Building automation systems include security systems, fire safety systems, lighting systems, and HVAC systems. The elements of a building automation system are widely dispersed throughout a facility. For example, an HVAC system may include temperature sensors and ventilation damper controls, as well as other elements that are located in virtually every area of a facility. Similarly, a security system may have intrusion detection, motion sensors and alarm actuators dispersed throughout an entire building or campus. Fire safety systems also include widely dispersed devices in the form of smoke alarms, pull stations and controllers. These building automation systems typically have one or more centralized control stations from which system data may be monitored and various aspects of system operation may be controlled and/or monitored.

Building automation systems may include vast numbers of devices and control points that may be communicated with, monitored, and controlled. Historically, management systems used to display and access data for monitoring and controlling operations of the building automation system have been relatively rigid in their user interface architecture. Because building automation systems are by nature unique to the layout and design of the particular building, maneuvering among displays of various elements of a complex, building automation system using a rigid user interface may be difficult and time consuming for building managers. Further, certain management operations of a building automation system may require that time sensitive information be delivered or identifiable in a timely manner.

There is a need, therefore, for an intuitive interface that allows for information to be delivered or identifiable in a timely manner.

SUMMARY OF THE DISCLOSURE

Various disclosed embodiments relate to systems and methods for displaying graphical symbol animation with evaluations for building automation graphics.

Various embodiments include management systems, methods, and mediums. A method includes identifying a value for a data point associated with a device in a building. The value is received from a management system operably connected to the device. The method includes mapping the value for the data point to a graphical representation of the value for the data point. The method includes generating a display comprising a graphic for the building and a symbol representing the device. The method includes displaying the graphical representation of the value for the data point in association with the symbol representing the device. Additionally, the method includes modifying the graphical representation of the value based on a change in the value in response to identifying the change in the value from the management system.

The foregoing has outlined rather broadly the features and technical advantages of the present disclosure so that those skilled in the art may better understand the detailed description that follows. Additional features and advantages of the disclosure will be described hereinafter that form the subject of the claims. Those of ordinary skill in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device or system.

Embodiments of the present disclosure provide display and animation of graphical symbols for conveying information and alerts regarding a status of devices in one or more buildings. Various embodiments provide substitutions for the graphical symbols to provide different types of information about a same device. Various embodiments include different types of evaluations for presenting information about devices.

Figure 1:
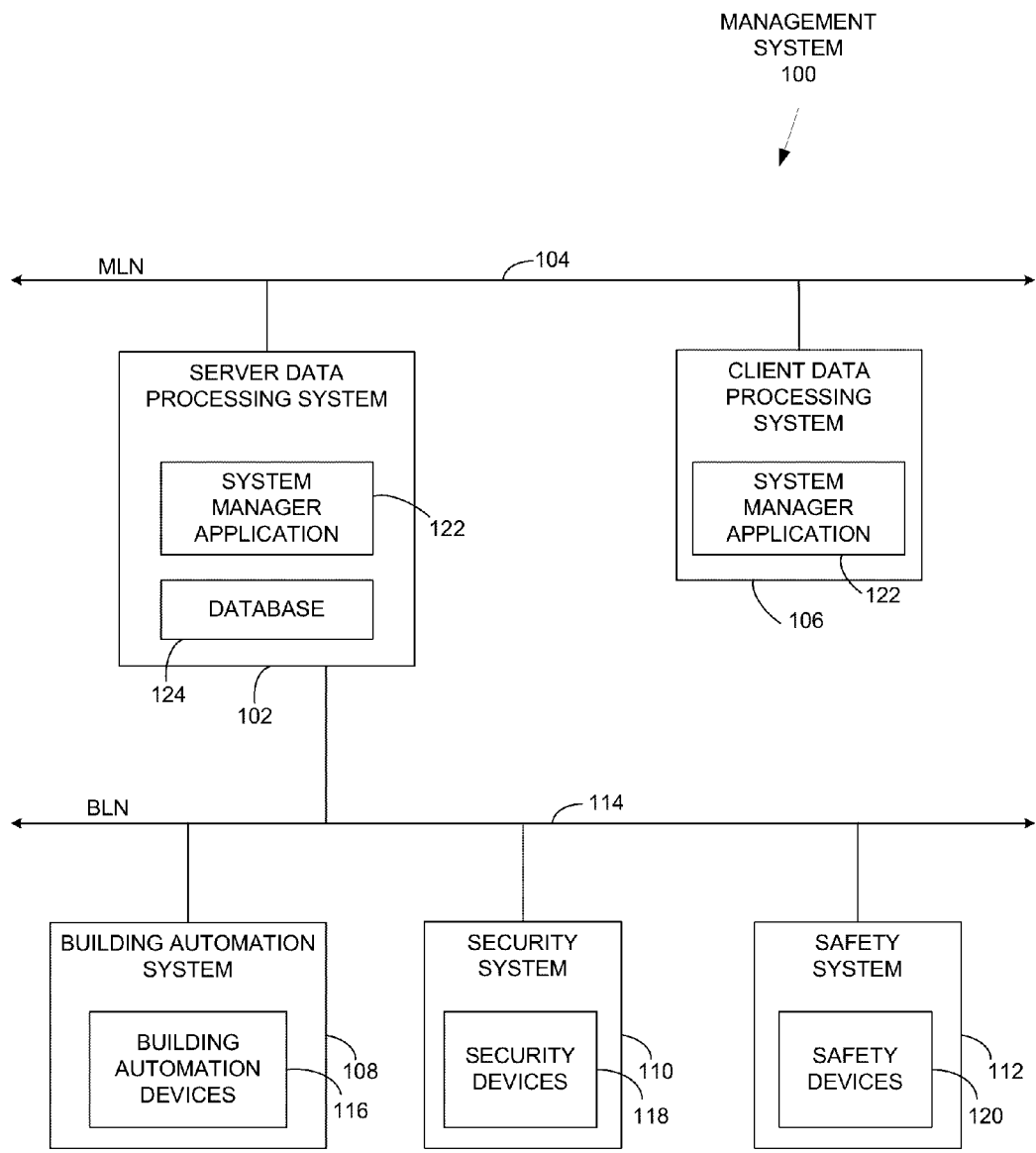
FIG. 1 illustrates a block diagram of a management system in which various embodiments of the present disclosure are implemented.

FIG. 1 illustrates a block diagram of management system 100 in which various embodiments of the present disclosure are implemented. In this illustrative embodiment, the management system 100 includes a server data processing system 102 connected, via a management level network (MLN) 104 to a client data processing system 106. The MLN 104 is a medium used to provide communication links between various data processing systems and other devices in the management system 100. MLN 104 may include any number of suitable connections, such as wired, wireless, or fiber optic links. MLN 104 may be implemented as a number of different types of networks, such as, for example, the internet, a local area network (LAN), or a wide area network (WAN). In some embodiments, elements of the management system 100 may be implemented in a cloud computing environment. For example, MLN 104 may include or be connected to one or more routers, gateways, switches, and/or data processing systems that are remotely located in a cloud computing environment.

In this illustrative embodiment, server data processing system 102 is operably connected to building automation system (BAS) 108, security system 110, and safety system 112 via building level network (BLN) 114. The BAS 108 is an environmental control system that controls at least one of a plurality of environmental parameters within a building or buildings, such as, for example, temperature, humidity, and/or lighting. The security system 110 controls elements of security within a building or buildings, such as, for example, location access, monitoring, and intrusion detection. The safety system 112 controls elements of safety within a building or buildings, such as, for example, smoke, fire, and/or toxic gas detection.

As depicted, the BAS 108 includes building automation devices 116, the security system 110 includes security devices 118, and the safety system 112 includes safety devices 120. In some embodiments, the BAS 108 may encompass the security system devices 118 and safety system devices 120. The devices 116-120 may be located inside or in proximity to one or more buildings managed using management system 100. The devices 116-120 are configured to provide, monitor, and/or control functions of the BAS 108, the security system 110, and/or the safety system 112 within one or more buildings managed using the management system 100. For example, without limitation, the devices 116-120 may include one or more field panels, field controllers, and/or field devices inside or in proximity to one or more buildings. More specifically, devices 116-120 may include one or more general-purpose data processing systems, programmable controllers, routers, switches, sensors, actuators, cameras, lights, digital thermostats, temperature sensors, fans, damper actuators, heaters, chillers, HVAC devices, detectors, motion sensors, glass-break sensors, security alarms, door/window sensors, smoke alarms, fire alarms, gas detectors, etc. The devices 116-120 may use the BLN 114 to exchange information with other components connected to the BLN 114, such as, for example, components within the BAS 108, the security system 110, the safety system 112, and/or the server data processing system 102. One or more of the devices 116-120 may also be connected via one or more field level networks (FLN) to a field panel or field controller for monitoring and controlling the respective field devices within a room, floor or other space of a building. For example, devices in the devices 116-120 may send and receive information to and from other devices in the devices 116-120 using one or more FLNs present in management system 100.

Various embodiments of the present disclosure are implemented in the management system 100. The management system 100 allows for systems and devices located throughout one or more buildings to be managed, monitored, and controlled from a single point and in a uniform manner. For example, a system manager application 122 may be installed on one or more workstations, such as server data processing system 102, client data processing system 106, and/or other devices connected via MLN 104. The system manager application 122 is a collection of software and associated data files that provides a user-modifiable and intuitive graphical user interface for allowing a user to monitor, review and control various points and devices in the management system 100. The system manager application 122 may include, for example, without limitation, executable files, user-layout-definition files, graphics control modules, an infrastructure interface, and/or a number of software extensions. In some embodiments, system manager application 122 may be an application framework as described in PCT Application Serial No. PCT/US2011/054141, entitled "Management System with Versatile Display" and U.S. Provisional Patent Application Ser. No. 61/541,925, entitled "Management System Using Function Abstraction for Output Generation".

The server data processing system 102 includes a database that stores information about the devices 116-120 within the management system 100. A database 124 includes one or more data models of data points, devices, and other objects in the management system 100. For example, the database 124 may store values for devices in the BAS 108 (e.g., temperature, alarm status, humidity). These values may be referred to as a point or data point. As referenced herein, a "point" or "data point" may be (i) any physical input or output to or from a respective controller, field device, sensor or actuator, or (ii) any virtual point associated with a control application or logic object within a field controller or field panel of the systems 108-112 that is measured, monitored or controlled. The database 124 may also store static information, such as model numbers, device types, and/or building and room-installation location information about devices in the management system 100. The database 124 may also store graphical models of one or more buildings managed by the management system 100. For example, the graphical models may include layouts and schematics of one or more rooms, floors and buildings managed by the management system 100.

In these illustrative embodiments, objects in the management system 100 include anything that creates, processes or stores information regarding data points, such as physical devices (BAS controllers, field panels, sensors, actuators, cameras, etc.), and maintains data files, such as control schedules, trend reports, calendars, and the like.

In various embodiments, the database 124 includes hierarchy definitions that identify relationships between objects in the system. For example, a hierarchy may include a folder for a "floor" in a building with multiple child folders in the form of "rooms". Each "room" object, in turn, may have several child objects, such as "ventilation damper", "smoke detector", and "temperature sensor". Such hierarchy definitions among objects may employ conventional BACnet structures or may take other forms. It will be appreciated that the use of hierarchical files in the management system 100 allows for technicians to define nearly any desirable hierarchy, the result of which is stored as one of the defined hierarchical files, as discussed further below. The database 124 stores files identifying different versions of hierarchies between the objects of the system, including those representative of the devices 116-120.

The system manager application 122 may further include software extensions or services that provide operations of the management system 100. For example, the software extensions may include a print manager, a reporting subsystem, and a status propagation manager. For example, a reporting subsystem implemented on a workstation data processing system (e.g., server data processing system 102 or client data processing system 106) is a system that manages the acquisition of data values from the database 124 for the generation of various reports. Such reports may include, for example, trends for a temperature of a room or the like. In another example, the status propagation manager implemented on a workstation data processing system (e.g., server data processing system 102 or client data processing system 106) propagates alarm status information, among other things, to various other data objects in the system. An example of a suitable alarm propagation system is provided in U.S. patent application Ser. No. 12/566,891, filed Sep. 25, 2009, which is assigned to the assignee of the present invention and is incorporated by reference herein.

In various embodiments, system manager application 122 may, via server data processing system 102 or client data processing system 106, implement scheduling functions of the management system 100. The scheduling function is used to control points in the various systems based on a time-based schedule. For example, the scheduling function may be used to command temperature set points based on the time of day and the day of the week within the building automation devices 116.

The server data processing system 102 is connected to the BLN 114 and includes one or more hardware and/or software interfaces for sending and receiving information to and from the devices 116-120 in the BAS 108, the security system 110, and/or the safety system 112. For example, the server data processing system 102 may request and receive data regarding a status of one or more devices in the devices 116-120. The system manager application 122, via server data processing system 102 or client data processing system 106, provides a user with the functionality to monitor real-time information about the status of one or more devices and objects in the management system 100. The system manager application 122, via server data processing system 102 or client data processing system 106, also provides a user with the functionality to issue commands to control one or more devices and objects in the management system 100. For example, one or more of the devices 116-120 may implement a network protocol for exchanging information within the management system, such as building automation and controls network (BACnet) or local operation network talk (LonTalk) protocols.

Additional descriptions and examples of the management system 100 and components that may be present within the management system 100 may be found in Patent Cooperation Treaty Application Serial No. PCT/US2011/054141, filed Sep. 30, 2011, entitled "MANAGEMENT SYSTEM WITH VERSATILE DISPLAY" and U.S. Provisional Patent Application Ser. No. 61/541,925, filed Sep. 30, 2011, entitled "MANAGEMENT SYSTEM USING FUNCTION ABSTRACTION FOR OUTPUT GENERATION". Both of these applications are hereby incorporated by reference as if fully set forth herein.

The illustration of the management system 100 in FIG. 1 is not meant to imply physical or architectural limitations to the manner in which different illustrative embodiments may be implemented. Other components in addition to and/or in place of the ones illustrated may be used. Some components may be unnecessary in some illustrative embodiments. For example, any number of data processing systems may be used as workstations in the management system 100, while functions of the system manager application 122 may be implemented in different data processing systems in the management system 100. In other examples, embodiments of the management system 100 may not include one or more of the BAS 108, the security system 110, and/or the safety system 112.

Figure 2:
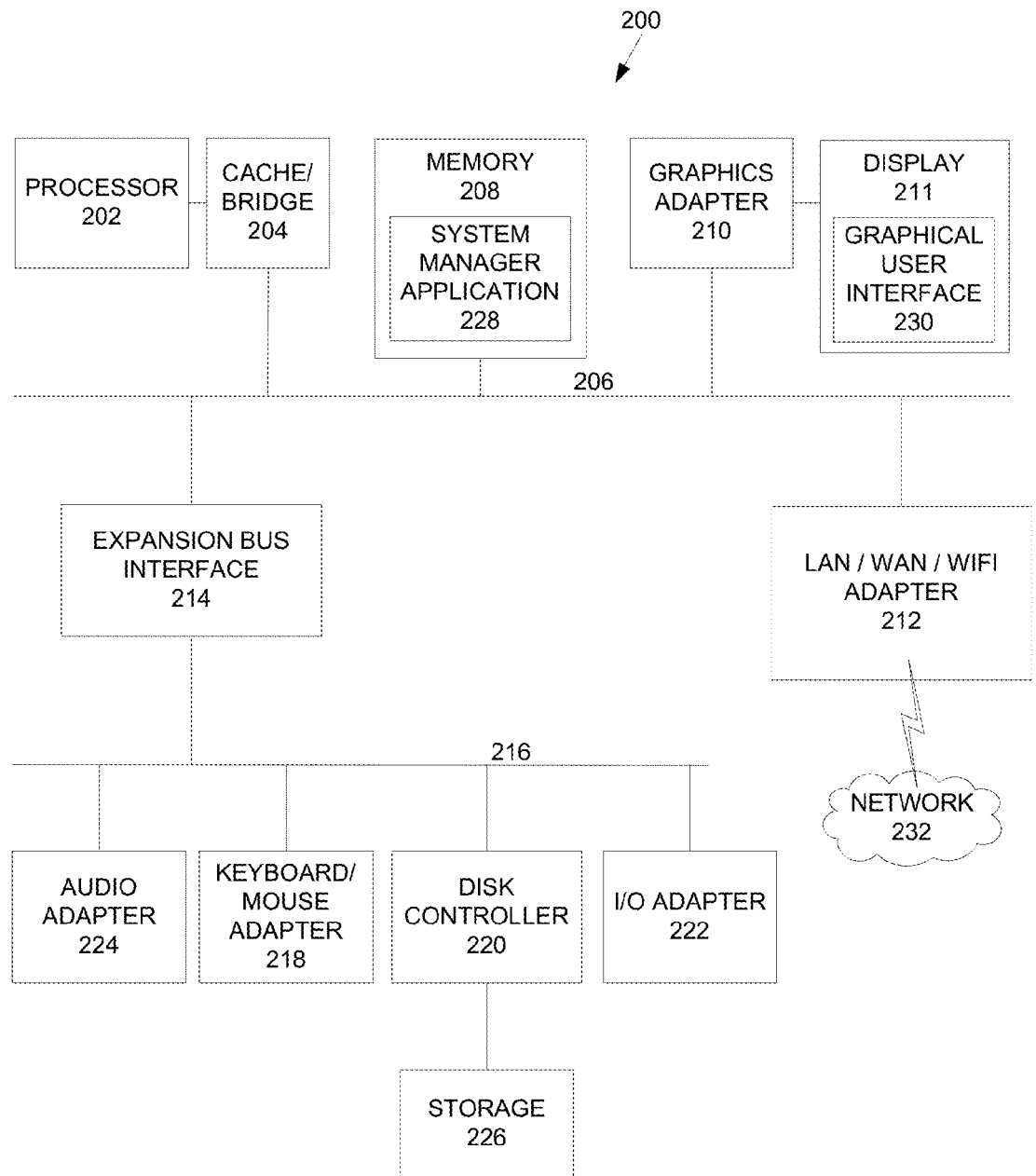
FIG. 2 illustrates a block diagram of a data processing system that may be employed in the management system for implementing various embodiments of the present disclosure.

FIG. 2 depicts a block diagram of a data processing system 200 in which various embodiments are implemented. The data processing system 200 is an example of one implementation of the server data processing system 102 in FIG. 1. The data processing system 200 is also an example of the client data processing system 106.

The data processing system 200 includes a processor 202 connected to a level two cache/bridge 204, which is connected in turn to a local system bus 206. The local system bus 206 may be, for example, a peripheral component interconnect (PCI) architecture bus. Also connected to the local system bus 206 in the depicted example are a main memory 208 and a graphics adapter 210. The graphics adapter 210 may be connected to a display 211.

Other peripherals, such as a local area network (LAN)/Wide Area Network (WAN)/Wireless (e.g. WiFi) adapter 212, may also be connected to the local system bus 206. An expansion bus interface 214 connects the local system bus 206 to an input/output (I/O) bus 216. The I/O bus 216 is connected to a keyboard/mouse adapter 218, a disk controller 220, and an I/O adapter 222. The disk controller 220 may be connected to a storage 226, which may be any suitable machine-usable or machine-readable storage medium, including, but not limited to, nonvolatile, hard-coded type mediums, such as read only memories (ROMs) or erasable, electrically programmable read only memories (EE-PROMs), magnetic tape storage, and user-recordable type mediums, such as floppy disks, hard disk drives, and compact disk read only memories (CD-ROMs) or digital versatile disks (DVDs), and other known optical, electrical, or magnetic storage devices.

Also connected to the I/O bus 216 in the example shown is an audio adapter 224, to which speakers (not shown) may be connected for playing sounds. The keyboard/mouse adapter 218 provides a connection for a pointing device (not shown), such as a mouse, trackball, trackpointer, etc. In some embodiments, the data processing system 200 may be implemented as a touch screen device, such as, for example, a tablet computer or a touch screen panel. In these embodiments, elements of the keyboard/mouse adapter 218 may be implemented in connection with the display 211.

In various embodiments of the present disclosure, the data processing system 200 is implemented as an installed workstation with a system manager application 228 installed in the memory 208. The system manager application 228 is an example of one embodiment of system manager application 122 in FIG. 1. For example, the processor 202 executes program code of the system manager application 228 to generate graphical user interface 230 displayed on display 211. In various embodiments of the present disclosure, the graphical user interface 230 includes a display of symbols representing devices inside or in proximity to one or more buildings managed by the management system 100. The graphical user interface 230 provides an interface for a user to view information and alerts for one or more devices, objects, and/or points within the management system 100. The graphical user interface 230 also provides an interface that is customizable to present the information and alerts in an intuitive and user-modifiable manner.

Those of ordinary skill in the art will appreciate that the hardware depicted in FIG. 2 may vary for particular implementations. For example, other peripheral devices, such as an optical disk drive and the like, also may be used in addition to or in place of the hardware depicted. The depicted example is provided for the purpose of explanation only and is not meant to imply architectural limitations with respect to the present disclosure.

One of various commercial operating systems, such as a version of Microsoft Windows™, a product of Microsoft Corporation located in Redmond, Wash. may be employed if suitably modified. The operating system may be modified or created in accordance with the present disclosure as described, for example, to implement graphic symbol animations with evaluations for building automation graphics.

LAN/WAN/Wifi adapter 212 may be connected to a network 232, such as, for example, MLN 104 in FIG. 1. As further explained below, the network 232 may be any public or private data processing system network or combination of networks, as known to those of skill in the art, including the Internet. Data processing system 200 may communicate over network 232 to one or more computers, which are also not part of the data processing system 200, but may be implemented, for example, as a separate data processing system 200.

Figure 3:
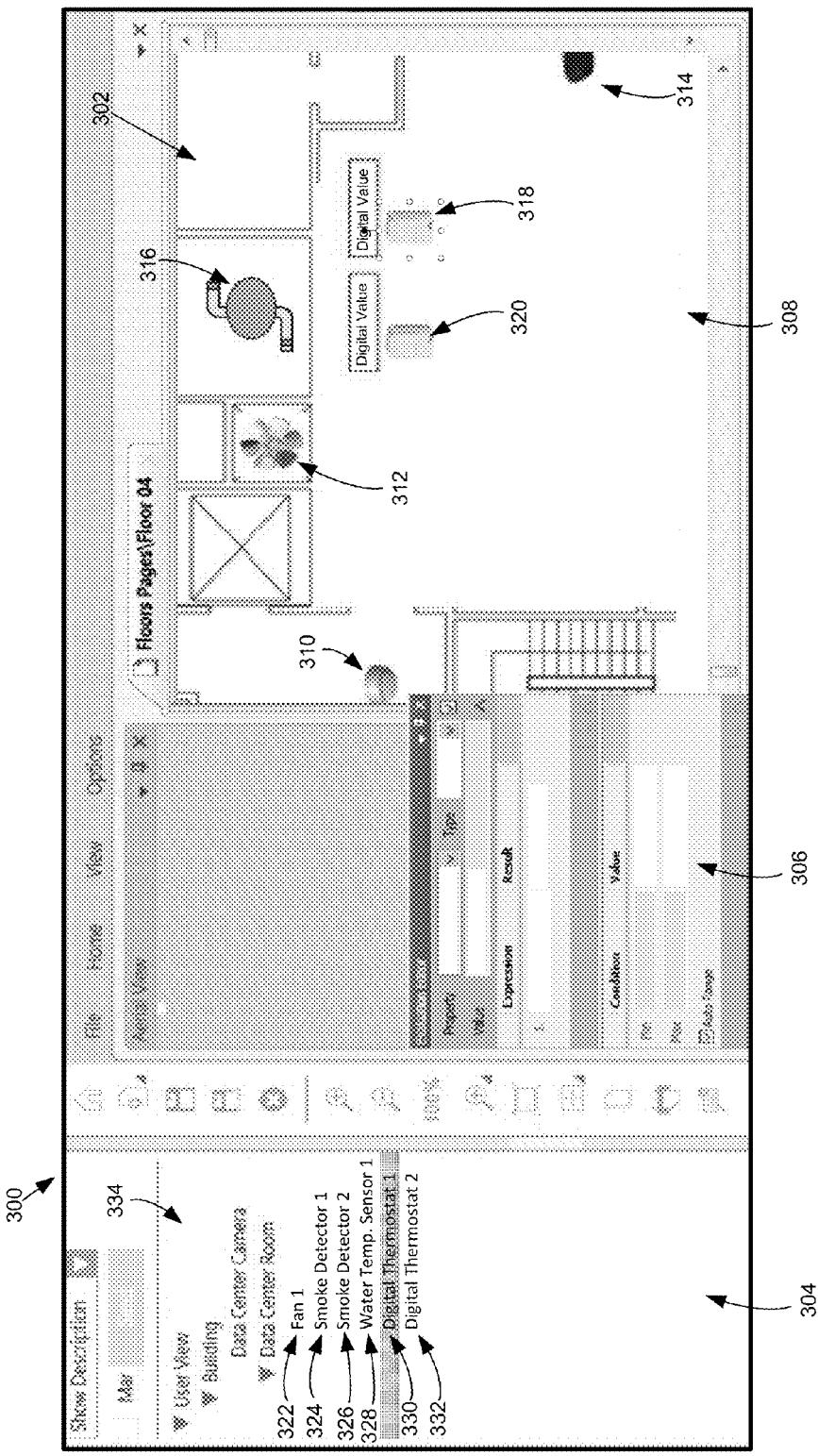
FIG. 3 illustrates a graphical user interface for generating graphical symbol animations for building automation graphics in accordance with disclosed embodiments.

FIG. 3 illustrates a graphical user interface 300 for generating graphical symbol animations for building automation graphics in accordance with disclosed embodiments. In this illustrative embodiment, the graphical user interface 300 is an example of one interface generated by the data processing system 200 and the system manager application 228. In this illustrative embodiment, the graphical user interface 300 comprises a multi-area or multi-pane display window displayed on a display device (e.g., display 211 in FIG. 2). The graphical user interface 300 includes a display of a building graphic 302 and a plurality of associated panes or windows 304-308. In this example, the building graphic 302 is a graphical representation of a floor of a building and is displayed in window 308. The plurality of associated panes or windows 304-308 includes one or more fields for generating and editing different symbol animations for the building graphic 302 displayed in a first or primary pane or window 308.

As used herein, a symbol or graphics symbol (e.g., symbols 310-320) is a reusable graphic image that may represent, for example, a piece of equipment, a device, a sensor, a floor, a component or an entity in association with the building graphic 302. Symbols are stored in a library (e.g., in database 124) and may be used to display values for objects in the management system 100. Symbols may be associated with one or more object types and be bound to object-type properties to create substitutions to provide a dynamic, visual representation of changing values in the management system 100. For example, upon placement of the symbols 310-320 onto a building graphic 302, the data processing system 200 may identify and display system object values in a graphics viewer during a runtime mode. Additionally, the data processing system 200 may include animation of various properties of the symbols to provide information about the system object values in an intuitive and customizable manner.

In various embodiments of the present disclosure, nearly every visual property of a graphic symbol may be used for animation. For example, utilizing the embodiments described herein, a graphics designer may build a library of symbols that have different properties, where each property of the symbol may be animated using different evaluation types, as will be described below. The properties of the symbol may be as simple, such as a collection of one or more lines or a particular shape (e.g., rectangle, triangle, ellipse etc.). The properties of the symbol may be more complex with varying geometries, gradients, and or fill colors. When these properties are grouped together, the properties form a composite symbol that may be used to represent one or more objects or devices in the management system 100. For example, the created graphic symbols may represent a condenser, smoke detectors, security alarms, etc. These created graphic symbols may then be saved as a persistent graphic element template object. Instances of the graphic symbols may be instantiated with either drag and drop of an object identifier in a list in a system browser or directly via a symbol library browser. As a result of the creation of the graphic symbols, a user may then use these symbols but actually does not even need to understand how they were created because each of the properties of the symbol are defined and may be animated via one or more evaluation types, as will be described below. Further, the association of the created graphic symbols as representing type of object or device, the user may not need to understand which symbol to select and may only need to select an object identifier from a system hierarchy.

In this illustrative example, the symbols 310-320 are associated with objects 322-332. For example, the fan symbol 312 is a graphical representation of the "fan 1" object 322 in the hierarchical structure 334 of system objects in the building graphic 302. For example, the fan symbol 312 is a graphical representation of a fan that is located in a building represented by building graphics 302 and managed by the management system 100. The "fan 1" object 322 is associated with a data point for the fan in the building. For example, the "fan 1" object 322 may be an object for returning a true/false value of whether the fan is presently operating or a value for a speed of the fan in the building managed by the management system 100. In another example, the thermostat symbol 318 is a graphical representation of the "digital thermostat 1" object 330 in the hierarchical structure 334 of system objects in the building graphic 302.

Placement of a symbol onto a graphic creates an "instance" or a copy of all the elements and substitution properties associated with the symbol onto the graphic. When a graphic that has a symbol associated with it is saved, the data processing system 200 may only store the referenced symbol and the associated properties for that symbol. As a result, modifications to the properties of the symbol placed in the graphic only affect the instance of the symbol included in the graphic.

Symbols may also be generic. For example, rather than a small illustration of a device as a symbol, the data processing system 200 may display a simple graphic, such as a shape for the symbol. The use of a generic symbol may be advantageous when, the symbol is linked to an object that has multiple properties, each of the properties with changing values. For example, the data processing system 200 may represent a temperature for a digital thermostat object as a color of the symbol and the state of an HVAC system controlled by the digital thermostat (e.g., cooling state, heating state, fan-only state) as a shape of the symbol. The symbol for the digital thermostat may be modified to represent one or more of the data points for the digital thermostat object. The modification of the symbol may be accomplished, for example, by extending the expression syntax with the use of the question mark in the expression for the data point.

In each instance of a symbol, the properties of the symbol may be substituted such that different instances of the symbol represent different properties. For example, thermostat symbol 318 may be a first instance of a thermostat symbol for the "digital thermostat 1" object 330 while thermostat symbol 320 is a second instance of the thermostat symbol the "digital thermostat 2" object 332. Substitutions allow for definition of what properties of a symbol are visible when the symbol is displayed. A substitution of properties in a symbol may be created by adding brackets into a properties evaluation of a graphic element within a symbol. Each symbol property and some or all of the attributes of the symbol may be substituted in each instance of the symbol. For example, the thermostat symbol 318 may be used to display a temperature property of the "digital thermostat 1" object 330 while thermostat symbol 320 may be used to display a state of an HVAC system controlled by a digital thermostat represented by the "digital thermostat 2" object 332.

In this illustrative example, the data processing system 200 provides an evaluation editor menu 306 to select or edit the properties, evaluation types, expressions, and conditions under which values of the objects 322-332 are displayed and/or animated in the symbols 310-320 displayed in the building graphic 302. As used herein, an evaluation is a type of illustration used to convey a state of a device or value of a data point in one or more intuitive, alerting, or eye-catching manners. For example, evaluation types may be used to provide a user with a way to easily perceive and monitor information about components within or in proximity to buildings managed by management system 100. For example, without limitation, exemplary evaluation types include simple, linear, discrete, multi, and animated.

In various embodiments, the data processing system 200 identifies which one of the evaluation types of a selected symbol is selected by a user through a user input into the evaluation editor menu 306. The data processing system 200 identifies a result of an expression for a data point of an object represented by the selected symbol and maps the expression value (i.e., the result of the expression) to an evaluation value. As used herein, an expression is a mathematical function of the value of a data point. For example, the expression may be just the value of the data point, some offset for the value of the data point, or some manipulation of the data point. The data processing system 200 then displays a graphical representation of the evaluation value based on the selected evaluation type. For example, the simple evaluation type is when the expression value is mapped into the evaluation type as is (i.e., only a data type mapping is done without any conditions). If the thermostat symbol 318, a temperature property of the "digital thermostat 1" object 330, and the simple evaluation type are selected, the data processing system 200 may identify the value of the data point for temperature detected by the digital thermostat represented by the "digital thermostat 1" object 330 as the evaluation value and display that value as the graphical representation of the value for the data point associated with the digital thermostat in the building managed by management system 100. Additional descriptions and examples of evaluation types are discussed below with regard to FIGS. 4-8 below.

The illustration of the graphical user interface 300 in FIG. 3 is intended as an illustrative example of one embodiment of the present disclosure and not meant to imply physical or architectural limitations to the manner in which different illustrative embodiments may be implemented. For example, any number of windows may be present in the graphical user interface 300. In other examples, any number of symbols and/or objects may be present in the building graphic 302.

Figure 4:
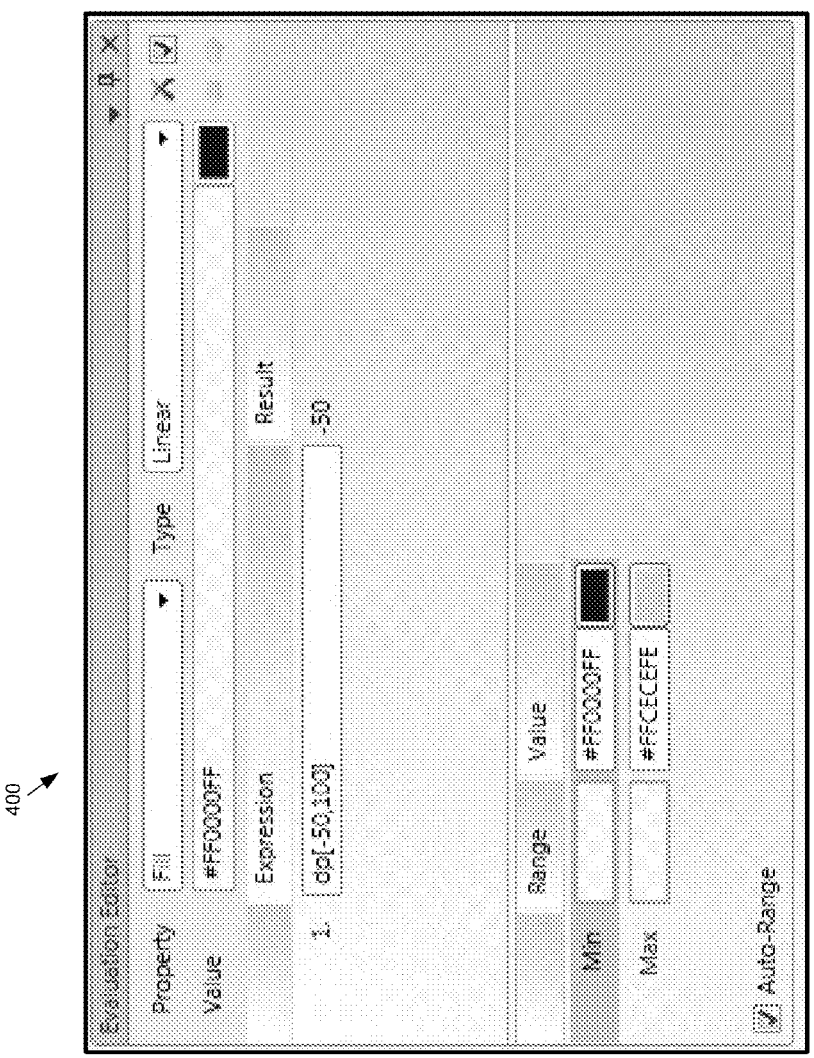
FIG. 4 illustrates an exemplary evaluation editor menu for linear evaluation type in accordance with disclosed embodiments.

FIG. 4 illustrates an exemplary evaluation editor menu 400 for linear evaluation types in accordance with disclosed embodiments. In this illustrative embodiment, evaluation editor menu 400 is an example of one implementation of the evaluation editor menu 306 in FIG. 3 where a linear evaluation type has been selected. For example, the data processing system 200 may receive user inputs through the evaluation editor menu 400 to generate and display a linear evaluation type as an animation of a symbol in the building graphic 302.

In this illustrative example, a linear evaluation type and a property to fill a symbol have been selected. For example, the symbol may be a representation of a value for water temperature reported by an object for a water temperature sensor (e.g., water temperature symbol 316 and "water temp. sensor 1" 328 in FIG. 3). In this example, the expression is a range of values for the value from the water temperature sensor from negative 50 to 100 and the result of the expression is negative 50. This minimum value for the expression value is mapped to the minimum evaluation value (#FF0000FF) which is a hexadecimal value representation for the color dark blue. The data processing system 200 then fills the water temperature symbol 316 with the dark blue evaluation value color to reflect that the water temperature is cold.

In this example, the data processing system 200 maps the range of the expression values (e.g., negative 50 to 100) to the range of evaluation values (e.g., #FF0000FF to #FFCECEFE). As a result, as the temperature reported from the water temperature sensor in the building increases, the data processing system 200 maps the value for temperature to colors representing the increase in temperature. For example, at an expression value of 100, the evaluation value may be a light blue color representing normal water temperature. In various embodiments, the data processing system 200 periodically receives values for the temperature data point from the management system 100 and updates the displayed evaluation value based on changes in the values for the temperature data point.

In another example, the auto range for the range of expression values may be disabled. In this example, the range of expression values may be set as a condition in the evaluation editor menu 400. For example, the range of condition values may be set from 10 to 30 and the data processing system 200 will then map the range of condition values to the range of evaluation values where the evaluation value is the dark blue color for any expression values at or below 10 and light blue for any values at or above 30.

In another example, only the minimum or maximum expression value may be specified with the other expression value unspecified. In this example, the corresponding minimum or maximum range condition values may be identified from the expression range. In yet another example, the minimum condition value may be larger than the maximum condition value. In this example, the data processing system 200 maps the lower temperature values to the higher evaluation values and the higher temperature values to the lower evaluation values for an inverse relationship between expression value and evaluation value.

Figure 5:
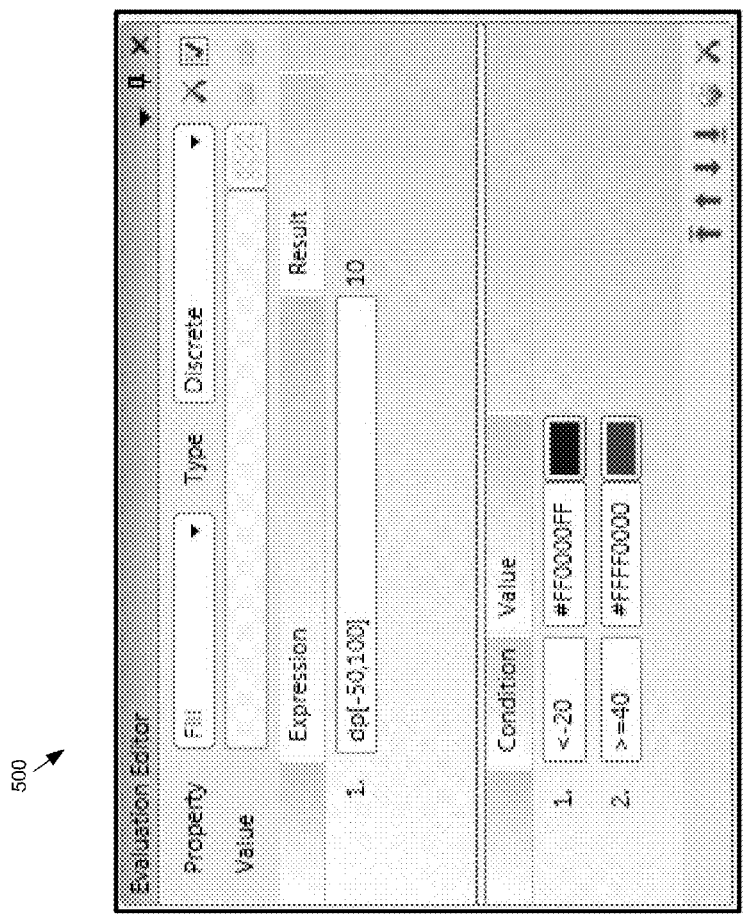
FIG. 5 illustrates an exemplary evaluation editor menu for discrete evaluation type in accordance with disclosed embodiments.

FIG. 5 illustrates an exemplary evaluation editor menu 500 for discrete evaluations type in accordance with disclosed embodiments. In this illustrative embodiment, evaluation editor menu 500 is an example of one implementation of the evaluation editor menu 306 in FIG. 3 where a discrete evaluation type has been selected. For example, the data processing system 200 may receive user inputs through the evaluation editor menu 500 to generate and display a discrete evaluation type as an animation of a symbol in the building graphic 302.

In this illustrative embodiment, the data processing system 200 performs a mapping between expression values and evaluation values similar to the description of the linear evaluation described with regard to FIG. 4 above. However, for the discrete evaluation type, the mapping is not a linear mapping. In the illustrated example, the range of expression values is from negative 50 to 100. However, the condition values are less than negative 20 and greater than or equal to 40. In this example, the data processing system 200 maps the range of expression values that are lower than negative 20 (i.e., negative 50 to less than negative 20) to the specified evaluation value (i.e., #FF0000FF or blue) and the range of expression values that are greater than or equal to 40 (i.e., 40 to 100) to the specified evaluation value (i.e., #FFFF0000 or red). For expression values that are not within one of the mapped ranges, the data processing system 200 associates these expression values with a default evaluation value, for example, a neutral color or possibly no color at all. Thus, for the depicted example where the expression result is 10, the evaluation value is the default evaluation value.

This use of discrete evaluation types may be particularly advantageous where a user desires to be notified when system values reach points on the extreme ends of acceptable values. For example, if the data point is water temperature value received from a water temperature sensor, values greater than or equal to negative 20 and less than 40 may be acceptable. In this scenario, the user may not need to be alerted or have their attention drawn to the symbol representing the water temperature sensor. However, should the water temperature drop below negative 20 or reach 40, in this particular example, the data processing system 200 would change the display of the color for the default evaluation value to that of blue or red indicating that the water temperature may be too cold or too hot, respectively.

Figure 6:
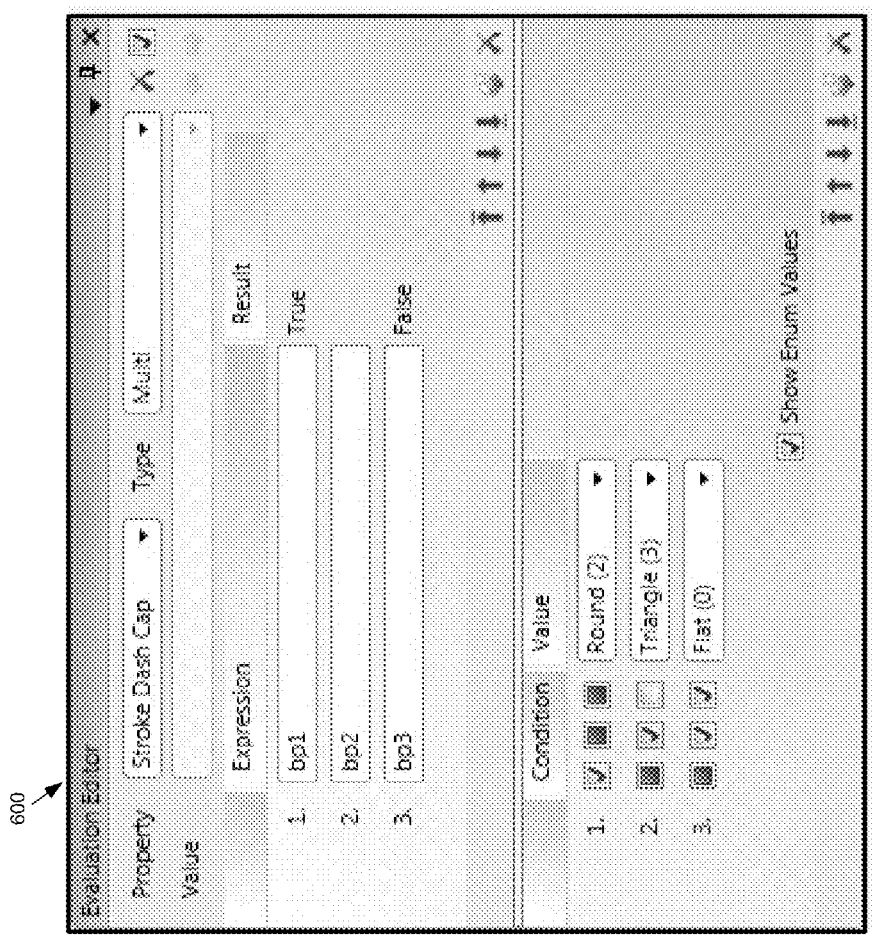
FIG. 6 illustrates an exemplary evaluation editor menu for multi evaluation type in accordance with disclosed embodiments.

FIG. 6 illustrates an exemplary evaluation editor menu for multi evaluation types in accordance with disclosed embodiments. In this illustrative embodiment, evaluation editor menu 600 is an example of one implementation of the evaluation editor menu 306 in FIG. 3 where a multi evaluation type has been selected. For example, the data processing system 200 may receive user inputs through the evaluation editor menu 600 to generate and display a multi evaluation type as an animation of a symbol in the building graphic 302.

In various embodiments, the multi evaluation type is used when the evaluation depends on more than one digital data point. For example, the use of multi evaluation types may be particularly advantageous when more than one condition needs to occur before an alert or notification change is warranted or when a particular result may be achieved through different ways.

In the example illustrated, the expression values include results evaluations of three different data points "bp1"-"bp3." For example, the three different data points may be received from three different sensors. In this example, the evaluation value should be "Round" if "bp1" is true with "bp2" and "bp3" ignored. The evaluation value should be "Triangle" if "bp2" is true and "bp3" is false with "bp1" ignored. The evaluation value should be "Flat" if "bp2" is true and "bp3" is also true with "bp1" ignored. In any other situation, (e.g., "bp1" and "bp2" are false) a default evaluation value will be used. In another example, a fourth condition with all checkboxes set to unspecified could have been added to effectively take the place of the default evaluation value.

Figure 7:
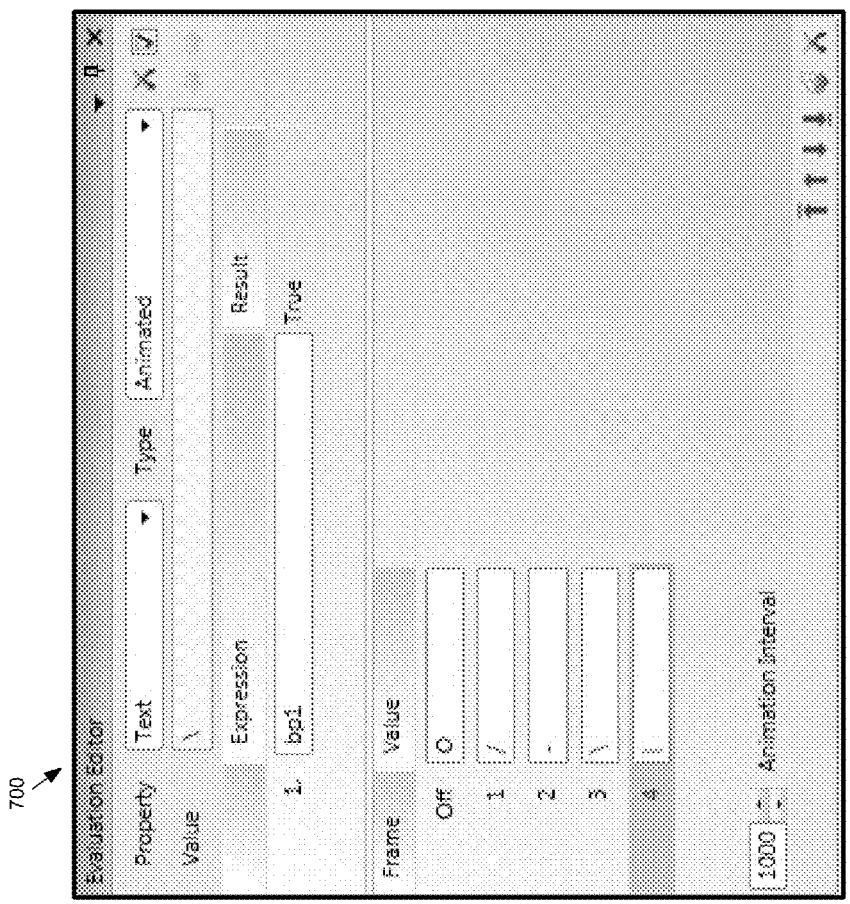
FIG. 7 illustrates an exemplary evaluation editor menu for animated evaluation type in accordance with disclosed embodiments.

FIG. 7 illustrates an exemplary evaluation editor menu for animated evaluation types in accordance with disclosed embodiments. In this illustrative embodiment, evaluation editor menu 700 is an example of one implementation of the evaluation editor menu 306 in FIG. 3 where an animated evaluation type has been selected. For example, the data processing system 200 may receive user inputs through the evaluation editor menu 700 to generate and display an animated evaluation type of a symbol in the building graphic 302.

In various embodiments, the animated evaluation type may be used when the value of the data point is changed with a certain interval. The animation of the evaluation value either is "off" or "on", based on the expression result. If the expression result is 0 or false, then the animation is off. Otherwise, the animation is on. This use of the animated evaluation type may be particularly useful to indicate to a user that a particular data point is continuing to be monitored and evaluated. For example, the animation of the evaluation value may indicate that an alarm is continuing to sound rather than had sounded at some point in the past and the display has not yet been updated.

In the illustrated example, when the result of the expression for the value of "bp1" is "false", the data processing system 200 displays the "Off" condition value of "O". When the result of the expression for the value of "bp1" is "true", the data processing system 200 cycles through a display of various text characters to indicate that the result is "true". The animation interval may be set for the length of time (in milliseconds) that each character is displayed.

Figure 8:
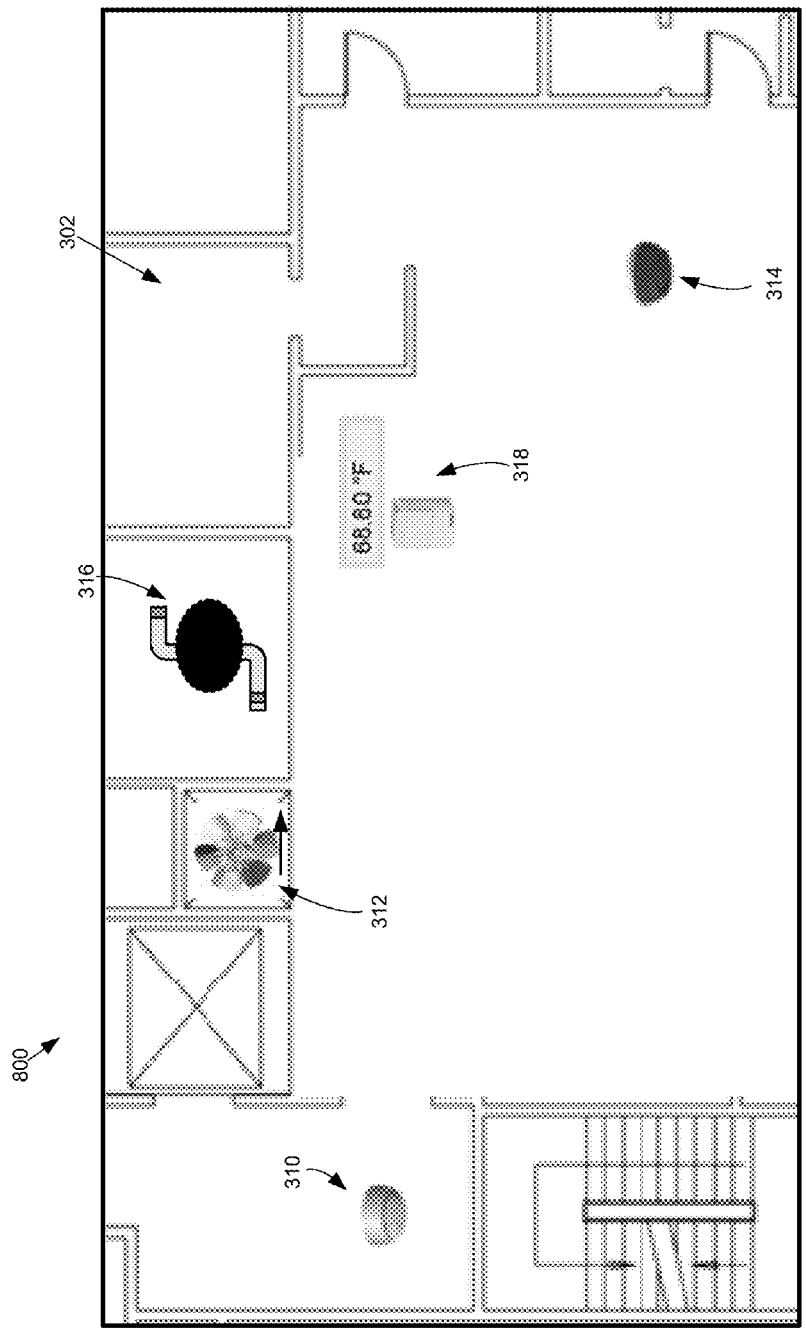
FIG. 8 illustrates an exemplary screen capture of graphical symbol animations with evaluations for building automation graphics in accordance with disclosed embodiments.

FIG. 8 illustrates an exemplary screen capture of graphical symbol animations with evaluations for building automation graphics in accordance with disclosed embodiments. In this illustrative embodiment, the graphical user interface 800 in FIG. 8 is an example of the graphical user interface 300 in a runtime mode. For example, the graphical user interface 800 is a display generated by the data processing system 200 while the system manager application 228 is in the runtime mode. The runtime mode is an active display mode displaying the building graphic 302 as well as a graphical representation of a state of one or more devices in the building represented by symbols in the building graphic 302. For example, the runtime mode allows a building manager to view and monitor information about system objects on a floor of a building.

In this illustrative example, symbols 310-318 provide an example of different animations for different evaluation types. For example, the smoke detector symbol 314 is red indicating that a smoke detector in a building managed by the management system 100 represented by the smoke detector symbol 314 is in an alarm state, while smoke detector symbol 310 is grey, indicating a normal state. This animation is an example of a discrete evaluation type. For example, an expression result for a data point for the alarm state being true results in a mapping to a red color while an expression result for the data point for the alarm state being false results in a mapping to a grey color or a default evaluation type. In another example, the fan symbol 312 has an arrow in a counter-clockwise direction indicating that a fan represented by the fan symbol 312 is both rotating at a speed greater than a threshold and in a counter-clockwise direction. This animation is an example of a multi evaluation type. For example, the data processing system 200 may identify that a condition where an expression result for a data point for fan speed and an expression result for a data point for direction of fan rotation results in an evaluation value of an arrow pointing to the right to be placed beneath the fan symbol 312.

In yet another example, the color displayed for the water temperature symbol 316 may be an example of a linear or discrete evaluation type. The data processing system 200 may identify the evaluation value to display based on a value of a data point for water temperature received from the management system based on a linear or discrete evaluation type and display the color corresponding to the evaluation value. In another example, the dashes surrounding the colored area of the water temperature symbol 316 is an example of an animated evaluation type. For example, the data processing system 200 may identify that the water temperature sensor is turned on, and values for water temperature are continuing to be received. In this example, the data processing system 200 may cycle through, for example, dashes, crosses, and squares to indicate that the water temperature is continuing to be monitored. If the data processing system 200 were no longer receiving values for the water-temperature data point, the data processing system 200 may instead display constant circles to indicate that the water temperature is not presently monitored. In another example, the digital thermostat symbol 318 is an example of a simple evaluation type. For example, the data processing system 200 may identify that the result of an evaluation including a data point for room temperature is 68.80° F. In this example, the data processing system 200 displays the evaluation value for room temperature as a number in association with the digital thermostat symbol 318.

FIGS. 4-8 are intended as illustrations of elements of various embodiments of the present disclosure and are not meant to imply physical or architectural limitations to the manner in which different illustrative embodiments may be implemented. For example, different types of symbols may be animated, and different properties of the symbol may be animated.

Figure 9:
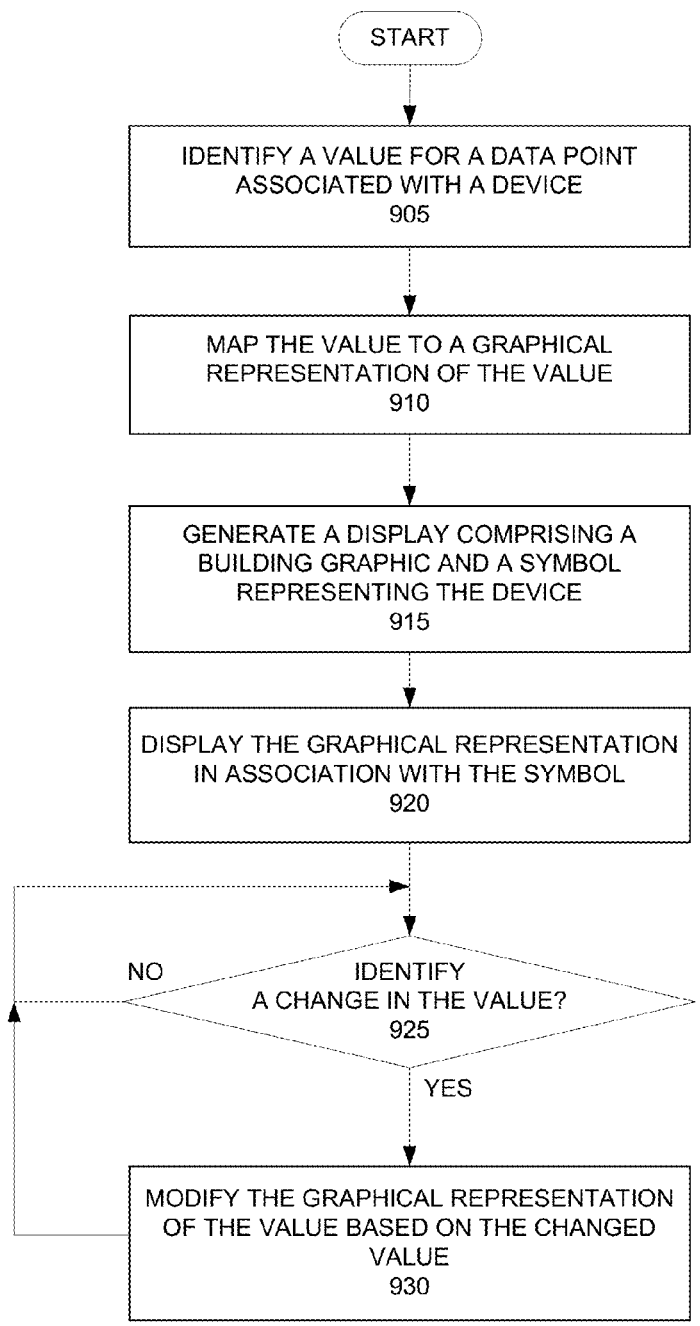
FIG. 9 illustrates a flowchart of a process for displaying a graphical representation of a value for a data point with building automation graphics in accordance with disclosed embodiments.

FIG. 9 illustrates a flowchart of a process for displaying a graphical representation of a value for a data point with building automation graphics in accordance with disclosed embodiments. This process may be performed, for example, in one or more data processing systems, such as, for example, the data processing system 200, configured to perform acts described below, referred to in the singular as "the system." The process may be implemented by executable instructions stored in a non-transitory computer-readable medium that cause one or more data processing systems to perform such a process. For example, the system manager application 228 may comprise the executable instructions to cause one or more data processing systems to perform such a process.

The process begins with the system identifying a value for a data point associated with a device (step 905). In step 905, the system may identify the value from a management system operably connected to the device. For example, the device may be one of devices 116-120 inside or in proximity to one or more buildings managed by the management system 100. The data point may be, for example, without limitation, a value for an input, output, monitoring state and/or any other data point identifiable about a device.

The system maps the value to a graphical representation of the value (step 910). In step 910, the system may proceed through one or more evaluation types to map the value of the data point to a graphical representation of the value. The graphical representation of the value may be text, a color, a symbol, an animation or any other graphical representation of the value.

The system generates a display comprising a building graphic and a symbol representing the device (step 915). In step 915, the symbol is an instance of an object for the data point. For example, the instance of the symbol may be an illustration of one or more properties of the symbol. A second instance of the symbol may include substations for the one or more properties of the symbol illustrated in the second instance of the symbol.

The system displays the graphical representation in association with the symbol (step 920). In step 920, for example, the system may display the graphical representation of the value above, below, to the left, to the right, on top of, or beneath the symbol. The graphical representation of the value may also be the color of the symbol that the system displays.

The system determines whether a change in the value has been identified (step 925). In step 925, the system monitors the value of the data point and performs the evaluation of the data point to determine whether the graphical representation of the value will change based on a change in the value of the data point. If the system determines that change in the value has not been identified, the system returns to step 925 and continues to monitor for a change in the value.

If the system determines that change in the value has been identified, the system modifies the graphical representation of the value based on the changed value (step 930). In step 930, the system identifies what the graphical representation of the value should be based on the changed value. If the identified graphical representation is different from the currently displayed graphical representation, the system changes the graphical representation displayed to the recently identified graphical representation. On the other hand, if, for example, the change in the value did not result in a change that should be displayed as the graphical representation of the value, the system may not change the graphical representation. The system then returns to step 925 and continues to monitor for a change in the value.

Figure 10:
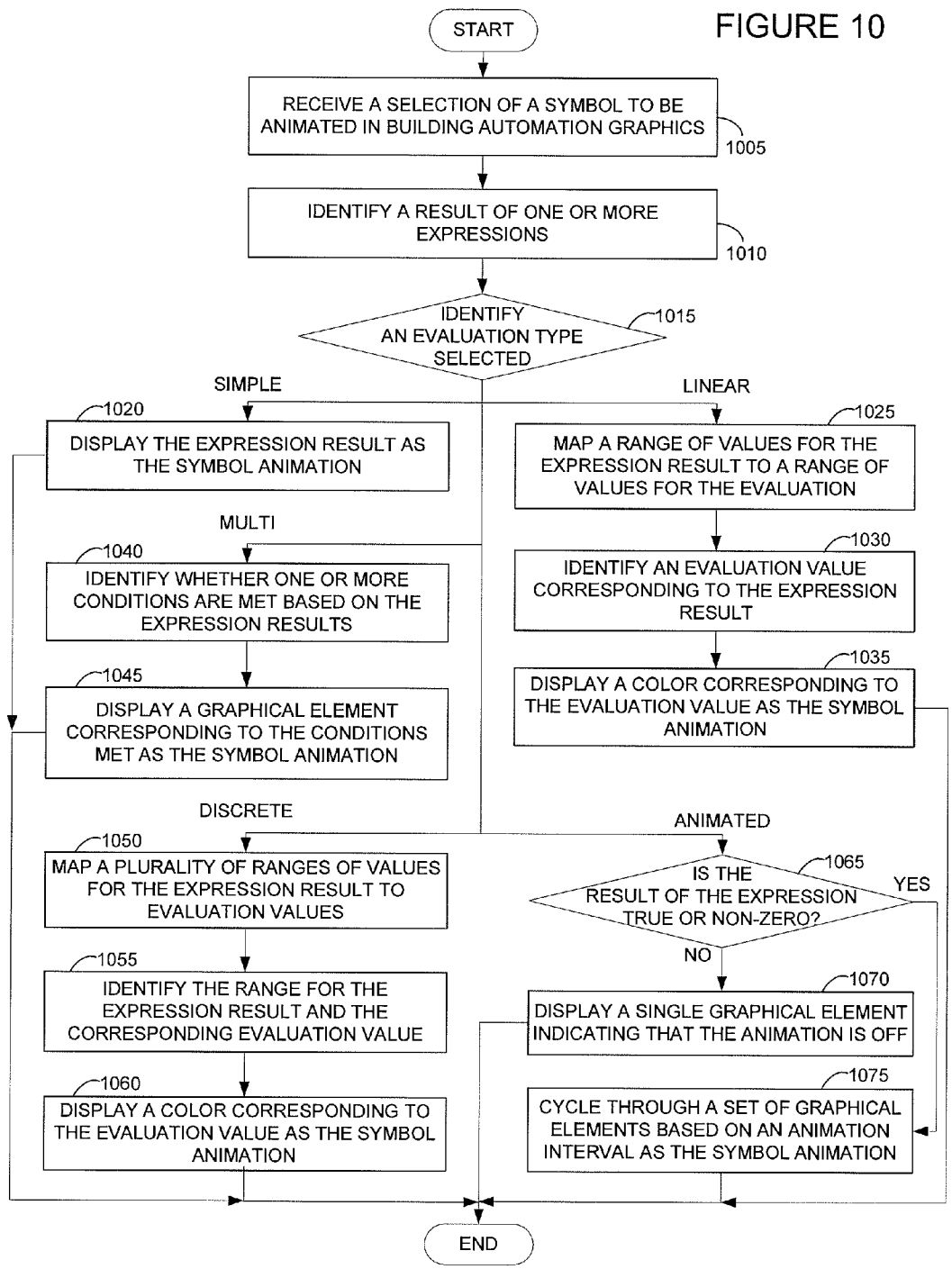
FIG. 10 illustrates a flowchart of a process for displaying symbol animation of a selected evaluation type with building automation graphics in accordance with disclosed embodiments.

FIG. 10 illustrates a flowchart of a process for displaying symbol animation of a selected evaluation type with building automation graphics in accordance with disclosed embodiments. This process may be performed, for example, in one or more data processing systems, such as, for example, the data processing system 200, configured to perform acts described below, referred to in the singular as "the system." The process may be implemented by executable instructions stored in a non-transitory computer-readable medium that cause one or more data processing systems to perform such a process. For example, the system manager application 228 may comprise the executable instructions to cause one or more data processing systems to perform such a process.

The process begins with the system receiving a selection of a symbol to be animated in building automation graphics (step 1005). The system identifies a result of one or more expressions (step 1010). In step 1010, the expressions are expressions for a value of a data point of a system object represented by the selected symbol. The expressions may be the value for the data point or mathematical functions on the value of the data point input by a user.

The system identifies an evaluation type selected (step 1015). In step 1015, the system may identify the selected evaluation type as one of simple, linear, discrete, multi, and animated. For example, the system may identify the selected evaluation type from a user input in the evaluation editor menu 306 in FIG. 3.

If the system identifies the evaluation type as simple, the system displays the expression result as the symbol animation (step 1020), with the process terminating thereafter. In step 1020, the system may map the result of the expression to the evaluation value and display the graphical representation of the evaluation value as the symbol animation.

Returning to step 1015, if the system identifies the evaluation type as linear, the system maps a range of values for the expression result to a range of values for the evaluation (step 1025). For example, in step 1025, the mapping of expression values to evaluation values may be implemented as described in the discussion of FIG. 4 above.

The system identifies an evaluation value corresponding to the expression result (step 1030). The system displays a color corresponding to the evaluation value as the symbol animation (step 1035), with the process terminating thereafter. For example, in step 1035, the display of the symbol animation may be displayed as illustrated by the water temperature symbol 316 in FIG. 8.

Returning to step 1015, if the system identifies the evaluation type as discrete, the system maps a plurality of ranges of values for the expression result to evaluation values (step 1050). For example, in step 1050, the mapping of expression values to evaluation values may be implemented as described in the discussion of FIG. 5 above.

The system identifies the range for the expression result and the corresponding evaluation value (step 1055). The system displays a color corresponding to the evaluation value as the symbol animation (step 1060), with the process terminating thereafter. For example, in step 1060, the display of the symbol animation may be displayed as illustrated by the water temperature symbol 316 or the smoke detector symbol 314 in FIG. 8.

Returning to step 1015, if the system identifies the evaluation type as multi, the system identifies whether one or more conditions are met based on the expression results (step 1040). For example, in step 1040, the identification of conditions met may be implemented as described in the discussion of FIG. 6 above. The system displays a graphical element corresponding to the conditions that are met as the symbol animation (step 1045), with the process terminating thereafter.

Returning to step 1015, if the system identifies the evaluation type as animated, the system determines whether the result of the expression is true or non-zero (step 1065). If the system determines that the result of the expression is false or zero, the system displays a single graphical element indicating that the animation is off (step 1070), with the process terminating thereafter.

Returning to step 1065, if the system determines that the result of the expression is true or non-zero, the system cycles through a set of graphical elements based on an animation interval as the symbol animation (step 1075), with the process terminating thereafter. For example, in step 1075, the cycling of graphical elements based on the animation interval may be implemented as described in the discussion of FIG. 6 above.

Disclosed embodiments provide display and animation of graphical symbols for conveying information and alerts regarding a status of devices in one or more buildings. Various embodiments provide substitutions for the graphical symbols to provide different types of information about a same device. Various embodiments include different types of evaluations for presenting information about devices in different and customizable manners.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 200 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method in a data processing system for displaying graphics, the method comprising:
    identifying a result of an expression comprising a variable dependent on a state of a device in a building as a value for a data point associated with the device in the building, the value received from a management system operably connected to the device;
    identifying a selection of an evaluation type from among a plurality of evaluation types;
    mapping the value for the data point to a graphical representation of the value for the data point according to the selected evaluation type, wherein when the selected evaluation type is a linear evaluation type, mapping the value for the data point to the graphical representation of the value comprises:
        identifying a range of values for the result of the expression and a range of values for an evaluation;
        mapping the range of expression values to the range of evaluation values, wherein each of the expression values in the range of values for the result of the expression is mapped to a different one of the evaluation values in the range of values for the result of the evaluation;
        identifying an evaluation value corresponding to the result based on the mapping; and
        identifying a color corresponding to the evaluation value as a graphical representation of the value for the data point;
    generating a display comprising a graphical representation of at least a portion of the building and a symbol representing the device, the symbol displayed in a location relative to the graphical representation of at least the portion of the building based on a location of the device in the building;
    displaying the graphical representation of the value for the data point in association with the symbol representing the device according to the selected evaluation type; and
    modifying the graphical representation of the value based on a change in the value in response to identifying the change in the value from the management system.

2. The method of claim 1, wherein the symbol is a first instance of a first object associated with the device, the method further comprising:
    identifying a second instance of the symbol;
    substituting the data point for the symbol with a second data point in the second instance of the symbol;
    identifying a second value for the second data point for the second instance of the symbol;
    mapping the second value for the second data point to a second graphical representation; and
    displaying the second graphical representation in association with the second instance of symbol in the display.

3. The method of claim 1, wherein, when the selected evaluation type is a discrete evaluation type, mapping the value for the data point to the graphical representation of the value comprises:
    identifying a plurality of ranges of values for the result of the expression and one or more evaluation values corresponding to each of the plurality of ranges of expression values;
    identifying a range in the plurality of ranges that the result is in and an evaluation value in the one or more evaluation values corresponding to the identified range; and
    identifying a color corresponding to the evaluation value as the graphical representation of the value for the data point.

4. The method of claim 1, wherein, when the selected evaluation type is a multi-evaluation type:
    identifying the value for the data point associated with the device further comprises identifying a results set from a plurality of expressions based on a plurality of data points associated with one or more devices, and
    mapping the value for the data point to the graphical representation of the value comprises mapping the results set to one of a plurality of graphical representations illustrating different outcomes of the plurality of expressions to identify the graphical representation displayed.

5. A method in a data processing system for displaying graphics, the method comprising:
    identifying a result of an expression comprising a variable dependent on a state of a device in a building as a value for a data point associated with the device in the building, the value received from a management system operably connected to the device;
    identifying a selection of an evaluation type from among a plurality of evaluation types;

mapping the value for the data point to a graphical representation of the value for the data point according to the selected evaluation type;

generating a display comprising a graphical representation of at least a portion of the building and a symbol representing the device, the symbol displayed in a location relative to the graphical representation of at least the portion of the building based on a location of the device in the building;

displaying the graphical representation of the value for the data point in association with the symbol representing the device according to the selected evaluation type, wherein, when the selected evaluation type is an animated evaluation type, displaying the graphical representation of the value for the data point in association with the symbol representing the device comprises:

determining whether the result of the expression is one of true and non-zero; and animating a display of the graphical representation of the value for the data point based on an animation interval in response to determining that the result of the expression is one of true and non-zero; and modifying the graphical representation of the value based on a change in the value in response to identifying the change in the value from the management system.

6. A data processing system configured to generate graphics for display, the data processing system comprising:

a storage device comprising a system manager application;

an accessible memory comprising instructions of the system manager application; and a processor configured to execute the instructions of the system manager application to:

identify a result of an expression comprising a variable dependent on a state of a device in a building as a value for a data point associated with the device in the building, the value received from a management system operably connected to the device;

identify a selection of an evaluation type from among a plurality of evaluation types;

map the value for the data point to a graphical representation of the value for the data point according to the selected evaluation type, wherein, when the selected evaluation type is a linear evaluation type, to map the value for the data point to the graphical representation of the value, processor is further configured to execute the instructions of the system manager application to:

identify a range of values for the result of the expression and a range of values for an evaluation;

map the range of expression values to the range of evaluation values, wherein each of the expression values in the range of values for the result of the expression is mapped to a different one of the evaluation values in the range of values for the result of the evaluation;

identify an evaluation value corresponding to the result based on the mapping; and identify a color corresponding to the evaluation value as a graphical representation of the value for the data point;

generate a display comprising a graphical representation of at least a portion of the building and a symbol representing the device, the symbol displayed in a location relative to the graphical representation of at least the portion of the building based on a location of the device in the building;

generate for display the graphical representation of the value for the data point in association with the symbol representing the device according to the selected evaluation type; and modify the graphical representation of the value based on a change in the value in response to identifying the change in the value from the management system.

7. The data processing system of claim 6, wherein the symbol is a first instance of a first object associated with the device and wherein the processor is further configured to execute the instructions of the system manager application to:

identify a second instance of the symbol;

substitute the data point for the symbol with a second data point in the second instance of the symbol;

identify a second value for the second data point for the second instance of the symbol;

map the second value for the second data point to a second graphical representation; and generate for display the second graphical representation in association with the second instance of symbol in the display.

8. The data processing system of claim 6, wherein, when the selected evaluation type is a discrete evaluation type, to map the value for the data point to the graphical representation of the value the processor is further configured to execute the instructions of the system manager application to:

identify a plurality of ranges of values for the result of the expression and one or more evaluation values corresponding to each of the plurality of ranges of expression values;

identify a range in the plurality of ranges that the result is in and an evaluation value in the one or more evaluation values corresponding to the identified range; and identify a color corresponding to the evaluation value as the graphical representation of the value for the data point.

9. The data processing system of claim 6, wherein, when the selected evaluation type is a multi-evaluation type:

to identify the value for the data point associated with the device the processor is further configured to execute the instructions of the system manager application to identify a results set from a plurality of expressions based on a plurality of data points associated with one or more devices, and to map the value for the data point to the graphical representation of the value the processor is further configured to execute the instructions of the system manager application to map the results set to one of a plurality of graphical representations illustrating different outcomes of the plurality of expressions to identify the graphical representation displayed.

10. A data processing system configured to generate graphics for display, the data processing system comprising:

a storage device comprising a system manager application;

an accessible memory comprising instructions of the system manager application; and a processor configured to execute the instructions of the system manager application to:

identify a result of an expression comprising a variable dependent on a state of a device in a building as a value for a data point associated with the device in the building, the value received from a management system operably connected to the device;

identify a selection of an evaluation type from among a plurality of evaluation types;

map the value for the data point to a graphical representation of the value for the data point according to the selected evaluation type;

generate a display comprising a graphical representation of at least a portion of the building and a symbol representing the device, the symbol displayed in a location relative to the graphical representation of at least the portion of the building based on a location of the device in the building;

generate for display the graphical representation of the value for the data point in association with the symbol representing the device according to the selected evaluation type, wherein, when the selected evaluation type is an animated evaluation type, to generate for display the graphical representation of the value for the data point in association with the symbol representing the device, the processor is further configured to execute the instructions of the system manager application to:

determine whether the result of the expression is one of true and non-zero; and cause animation of a display of the graphical representation of the value for the data point based on an animation interval in response to determining that the result of the expression is one of true and non-zero; and modify the graphical representation of the value based on a change in the value in response to identifying the change in the value from the management system.

11. A non-transitory computer-readable medium encoded with executable instructions that, when executed, cause one or more data processing systems to:

identify a result of an expression comprising a variable dependent on a state of a device in a building as a value for a data point associated with the device in the building, the value received from a management system operably connected to the device;

identify a selection of an evaluation type from among a plurality of evaluation types, wherein the evaluation type defines a type of illustration for a graphical representation for the value of the data point;

map the value for the data point to the graphical representation of the value for the data point according to the selected evaluation type, wherein, when the selected evaluation type is a linear evaluation type, the instructions that cause the one or more data processing systems to map the value for the data point to the graphical representation of the value comprise instructions that cause the one or more data processing systems to:

identify a range of values for the result of the expression and a range of values for an evaluation;

map the range of expression values to the range of evaluation values, wherein each of the expression values in the range of values for the result of the expression is mapped to a different one of the evaluation values in the range of values for the result of the evaluation;

identify an evaluation value corresponding to the result based on the mapping; and identify a color corresponding to the evaluation value as a graphical representation of the value for the data point;

generate a display comprising a graphical representation of at least a portion of the building and a symbol representing the device, the symbol displayed in a location relative to the graphical representation of at least the portion of the building based on a location of the device in the building;

generate for display the graphical representation of the value for the data point in association with the symbol representing the device according to the selected evaluation type; and modify the graphical representation of the value based on a change in the value in response to identifying the change in the value from the management system.

12. The computer-readable medium of claim 11, wherein the symbol is a first instance of a first object associated with the device and wherein the computer-readable medium is further encoded with executable instructions that, when executed, cause one or more data processing systems to:

identify a second instance of the symbol;

substitute the data point for the symbol with a second data point in the second instance of the symbol;

identify a second value for the second data point for the second instance of the symbol;

map the second value for the second data point to a second graphical representation; and generate for display the second graphical representation in association with the second instance of symbol in the display.

13. The computer-readable medium of claim 11, wherein, when the selected evaluation type is a discrete evaluation type, the instructions that cause the one or more data processing systems to map the value for the data point to the graphical representation of the value comprise instructions that cause the one or more data processing systems to:

identify a plurality of ranges of values for the result of the expression and one or more evaluation values corresponding to each of the plurality of ranges of expression values;

identify a range in the plurality of ranges that the result is in and an evaluation value in the one or more evaluation values corresponding to the identified range; and identify a color corresponding to the evaluation value as the graphical representation of the value for the data point.

14. The computer-readable medium of claim 11, wherein, when the selected evaluation type is a multi-evaluation type:

the instructions that cause the one or more data processing systems to identify the value for the data point associated with the device comprise instructions that cause the one or more data processing systems to identify a results set from a plurality of expressions based on a plurality of data points associated with one or more devices, and wherein the instructions that cause the one or more data processing systems to map the value for the data point to the graphical representation of the value comprise instructions that cause the one or more data processing systems to map the results set to one of a plurality of graphical representations illustrating different outcomes of the plurality of expressions to identify the graphical representation displayed.

15. A non-transitory computer-readable medium encoded with executable instructions that, when executed, cause one or more data processing systems to:

identify a result of an expression comprising a variable dependent on a state of a device in a building as a value for a data point associated with the device in the building, the value received from a management system operably connected to the device;

identify a selection of an evaluation type from among a plurality of evaluation types;

map the value for the data point to a graphical representation of the value for the data point according to the selected evaluation type;

generate a display comprising a graphical representation of at least a portion of the building and a symbol representing the device, the symbol displayed in a location relative to the graphical representation of at least the portion of the building based on a location of the device in the building;

generate for display the graphical representation of the value for the data point in association with the symbol representing the device according to the selected evaluation type, wherein, when the selected evaluation type is an animated evaluation type, the instructions that cause the one or more data processing systems to generate for display the graphical representation of the value for the data point in association with the symbol representing the device comprise instructions that cause the one or more data processing systems to:

determine whether the result of the expression is one of true and non-zero; and cause animation of a display of the graphical representation of the value for the data point based on an animation interval in response to determining that the result of the expression is one of true and non-zero; and modify the graphical representation of the value based on a change in the value in response to identifying the change in the value from the management system.

16. The computer-readable medium of claim 15, wherein the evaluation type defines a type of illustration for the graphical representation of the value for the data point.

17. The method of claim 1, wherein the evaluation type defines a type of illustration for the graphical representation of the value for the data point.

18. The method of claim 5, wherein the evaluation type defines a type of illustration for the graphical representation of the value for the data point.

19. The data processing system of claim 6, wherein the evaluation type defines a type of illustration for the graphical representation of the value for the data point.

20. The data processing system of claim 10, wherein the evaluation type defines a type of illustration for the graphical representation of the value for the data point.

* * * * *